(12) United States Patent
Du et al.

(10) Patent No.: US 12,438,104 B2
(45) Date of Patent: Oct. 7, 2025

(54) APPARATUS AND METHOD FOR GENERATING HARDWARE-BASED PHYSICAL UNCLONABLE FUNCTIONS AND THEIR USE

(71) Applicants: Fraunhofer-Gesellschaft zur Foerderung der angewandten Forschung e.V., Munich (DE); Universitaet Stuttgart, Stuttgart (DE)

(72) Inventors: Nan Du, Chemnitz (DE); Heidemarie Schmidt, Chemnitz (DE); Stefan Schulz, Chemnitz (DE); Ilia Polian, Stuttgart (DE); Danilo Buerger, Chemnitz (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 180 days.

(21) Appl. No.: 18/070,290

(22) Filed: Nov. 28, 2022

(65) Prior Publication Data

US 2023/0093922 A1   Mar. 30, 2023

Related U.S. Application Data

(63) Continuation of application No. PCT/EP2021/064269, filed on May 27, 2021.

(30) Foreign Application Priority Data

May 29, 2020   (DE) .................. 102020206792.9

(51) Int. Cl.
G06F 21/75   (2013.01)
G11C 13/00   (2006.01)
H01L 23/00   (2006.01)

(52) U.S. Cl.
CPC ............ *H01L 23/573* (2013.01); *G06F 21/75* (2013.01); *G11C 13/0007* (2013.01);
(Continued)

(58) Field of Classification Search
CPC ... H01L 23/573; G06F 21/75; G11C 13/0007; G11C 13/004; G11C 13/0059;
(Continued)

(56) References Cited

U.S. PATENT DOCUMENTS 10,860,291 B2   12/2020   Jabir et al.
2014/0268994 A1*   9/2014   Rose .................. G06F 21/73
365/148

(Continued)

FOREIGN PATENT DOCUMENTS

CN   109495272 A   3/2019
CN   110751968 A   2/2020
(Continued)

OTHER PUBLICATIONS

Gao, L, et al., "Physical unclonable function exploiting sneak paths in resistive cross-point array", IEEE Trans. Electron Devices, 63, pp. 3109-3115.
(Continued)

*Primary Examiner* — Alexander Sofocleous
*Assistant Examiner* — Tracy Hampton
(74) *Attorney, Agent, or Firm* — Perkins Cole LLP; Michael A. Glenn

(57) ABSTRACT

An apparatus for generating a binary numerical sequence is provided. The apparatus is configured to apply a first write voltage or a second write voltage, different from the first write voltage, as a write voltage to each of two or more switchable elements, and/or to apply a first read voltage or a second read voltage, different from the first read voltage, as a read voltage to each of the two or more switchable
(Continued)

elements. Each switchable element of the two or more switchable elements is configured to output, in dependence on the write voltage applied to the switchable element and/or in dependence on the read voltage applied to the switchable element, an output voltage with a first random or pseudo-random voltage value from a first voltage value range or with a second random or pseudo-random voltage value from a second voltage value range.

15 Claims, 5 Drawing Sheets

(52) U.S. Cl.
CPC ........ *G11C 13/004* (2013.01); *G11C 13/0059* (2013.01); *G11C 13/0069* (2013.01); *G11C 2213/31* (2013.01)

(58) Field of Classification Search
CPC ............ G11C 13/0069; G11C 2213/31; G11C 16/0483; G11C 16/20; G11C 16/26
USPC ......................................................... 365/148
See application file for complete search history.

(56) References Cited

U.S. PATENT DOCUMENTS

| | | | |
|---|---|---|---|
| 2015/0364682 A1* | 12/2015 | You | H10N 70/826 257/3 |
| 2016/0379110 A1 | 12/2016 | Eleftheriou et al. | |
| 2018/0316493 A1 | 11/2018 | Kvatinsky et al. | |

FOREIGN PATENT DOCUMENTS

| | | |
|---|---|---|
| GB | 2548081 A | 9/2017 |
| WO | 2021047527 A1 | 3/2021 |

OTHER PUBLICATIONS

Guajardo, Jorge, et al., "FPGA Intrinsic PUFs and Their Use for IP Protection", in CHES, 2007, vol. 4727, pp. 63-80, pp. 63-80.
Holcomb, Daniel E, et al., "Power-up SRAM state as an identifying fingerprint and source of true random numbers", IEEE Transactions on Computers 58 (9), 2008, pp. 1198-1210.
Kim, Jangbae, et al., "Anti-counterfeit nanoscale fingerprints based on randomly distributed nanowires", Nanotechnology, 25, 155303 30, 8 pp.
Liu, Rui, et al., "A highly reliable and tamper-resistant RRAM PUF: Design and experimental validation", 2016 IEEE International Symposium on Hardware Oriented Security and Trust (HOST), IEEE, 6 pp.
Liu, Rui, "Experimental Characterization of Physical Unclonable Function Based on 1kb Resistive Random Access Memory Arrays", IEEE Electron Device Letters, 36(12), pp. 1380-1383.
Pappu, Ravikanth, et al., "Physical one-way functions", Science, 297(5589), pp. 2026-2030.
Raghavan, N, et al., "RTN insight to filamentary instability and disturb immunity in ultra-low power switching HfOx and AlOx RRAM", IEEE Sym. VLSI Tech., 164 (2013), 2 pp.
Rajendran, Jeyavijayan, et al., "Nano-PPUF: A Memristor-based Security Primitive", 2012 IEEE Computer Society Annual Symposium on VLSI, IEEE, 2012, 4 pp.
Regazzoni, Francesco, et al., "Securing the hardware of cyber-physical systems", Asian South Pacific Design Automation Conf. (ASP-DAC), pp. 194-199.
Schmidt, Heidemarie, et al., "Big Data ohne Energiekollaps", Physik in unserer Zeit 46 (2) (2015, 6 pp.
Smith, Alison F, et al., "Plasmonic Nanoparticles as a Physically Unclonable Function for Responsive Anti-Counterfeit Nanofingerprints", Adv. Funct. Mater. 26, 2016, pp. 1315-1321.
Terai, M., et al., "Effect of bottom electrode of ReRAM with Ta2O5/TiO2 stack on RTN and retention", IEDM Tech. Dig., 775, 4 pp.
Weber, Rolf H, et al., "Internet of Things", Springer. vol. 12, 2010, 156 pp.
You, Tiangui, et al., "Bipolar electric-field enhanced trapping and detrapping of mobile donors in BiFeO3 memristors", ACS applied materials & interfaces, 6.22 (2014), 7 pp.
Gassend, Blaise, et al., "Silicon Physical Random Functions", in Proc. CCS, ACM, 148-160.
Helinski, R, et al., (Uploaded in 2 parts) "A physical unclonable function defined using power distribution system equivalent resistance variations—part 1 of 2", DAC '09 Proceedings of the 46th Annual Design Automation Conference, 676-681.
Holcomb, D. et al., "Initial SRAM state as a fingerprint and source of true random numbers for RFID tags", Proceedings of the Conference on RFID Security 7 (2), 01 (2007).
Hori, Yohei, "Quantitative and statistical performance evaluation of arbiter physical unclonable functions on FPGAs", In: 2010 international conference on reconfigurable computing and FPGAs (ReConFig)., IEEE pp. 298-303.
Horstmeyer, Roarke, et al., "Physical key-protected one-time pad", Scientific Reports 3, 3543.
Koeberl, Patrick, et al., "Memristor PUFs: A new generation of memory-based Physically Unclonable Functions", Design, Automation & Test 20 in Europe conference & Exhibition (DATE), 428-431.
Lee, J. K, et al., "Extraction of trap location and energy from random telegraph noise in amorphous TiOx resistance random access memories", Appl. Phy. Lett. 98, 143502, Apr. 2011.
Maiti, Abhranil, et al., "A systematic method to evaluate and compare the performance of physical unclonable functions", In: Athanas, P., Pnevmat-ikatos, D., Sklavos, N. (eds.) Embedded systems design with FPGAs, 35 Springer, New York, pp. 245-267.
Maiti, Abhranil, et al., "Improving the quality of a physical unclonable function using configurable ring oscillators", In: International Conference on Field Programmable Logic and Applications, FPL International Conf. 2009, IEEE, 703-707.
Rose, Garrett S, et al., "A write-time based memristive PUF for hardware security applications", in IEEE/ACM International Conference on Computer-Aided Design (ICCAD), Nov. 2013.
Suh, G. Edward, et al., "Physical unclonable functions for device authentication and secret key generation", Proc. Des. Autom. Conf. ACM, 2007, 9-14.
Yansong, Gao, "mrPUF: A Novel Memristive Device Based Physical Unclonable Function", ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, XP047333134, pp. 595-596.
Athanas, Peter, et al., "[Uploaded in 3 parts] Embedded Systems Design with FPGAs", Springer Science Bussiness Media, LLC.

* cited by examiner

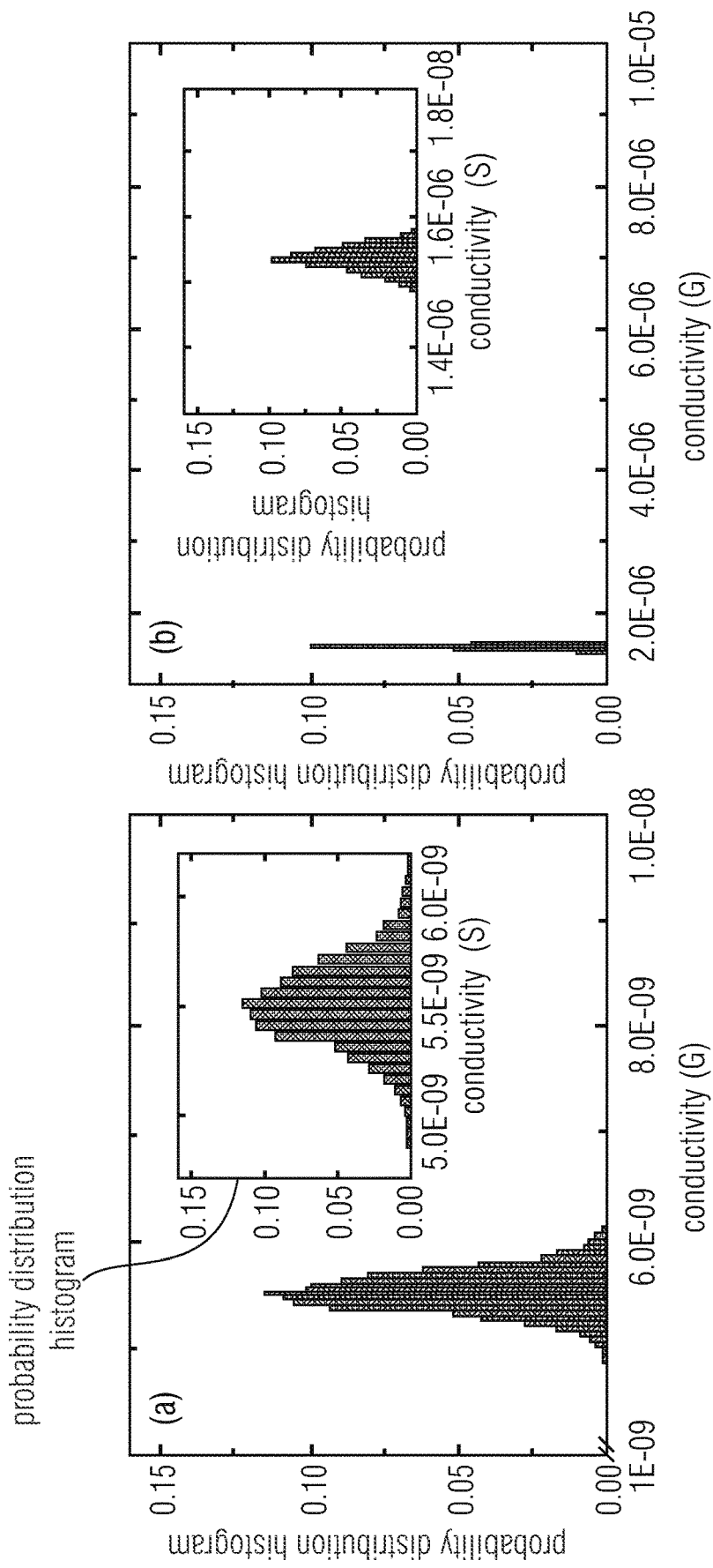
Fig. 3 (Part 1)

(Part 2)

APPARATUS AND METHOD FOR GENERATING HARDWARE-BASED PHYSICAL UNCLONABLE FUNCTIONS AND THEIR USE

CROSS-REFERENCES TO RELATED APPLICATIONS

This application is a continuation of copending International Application No. PCT/EP2021/064269, filed May 27, 2021, which is incorporated herein by reference in its entirety, and additionally claims priority from German Application No. 10 2020 206 792.9, filed May 29, 2020, which is incorporated herein by reference in its entirety.

BACKGROUND OF THE INVENTION

The application concerns an apparatus and a method for hardware-based physical unclonable functions and their use, in particular an apparatus for hardware-based PUFs with electroforming-free, bipolar memristors (PUF—Physical Unclonable Function). Furthermore, the application concerns the design of an electronic circuit and a method for operating a PUF.

Recent advances have led to the Internet of Things (IoT)—a network of interconnected electronic devices and sensors that collect data, exchange data via a cloud, and interact with each other [1]. The IoT is governed by a series of requirements. For example, these include an extremely low current consumption for the long-term autonomous operation by means of a battery, and reliable operation under rough conditions, for example extreme temperatures, mechanical shocks, or electrical interferences. One of the main demands is the resilience against possible malicious cyber-attacks. The latter requirement is particularly hard to be fulfilled since cyber-attacks are carried out via network connections and also via physical attacks of adversaries [2]. Advances in the nanotechnology promise to overcome some of the challenges, e.g. by using the memristor-based physical unclonable function (PUF), i.e. generating secret cryptographic keys by means of basic hardware elements.

In the era of IoT, PUF represents an innovative hardware security primitive that may be used as cryptographic keys in different application fields. It has been shown already that PUFs may be realized on the basis of silicone CMOS technology. In 2002 (3), a PUF was realized for the first time for the authentication of devices and the generation of keys [3-10]. In general, PUFs utilize the inherent randomness of the physical system or manufacturing variations so as to generate during the request of "challenges" (input) unambiguous "responses" (output) that practically cannot be duplicated. Electronical CMOS technology-based PUFs (e.g. arbiter PUF [11-12] and SRAM PUF [13-15]) usually utilize the randomness introduced during their manufacturing process, such as the fluctuations of line edge roughness or doping atom variation. However, such CMOS-based PUFs are not efficient with respect to their surface area and have an error rate that is larger than 20%. Thus, CMOS-based PUFs involve complicated post-processing of data [16].

The first memristor-based PUFs were proposed in 2013 [17-18]. Random telegraph noise (RTN) was used as the entropy source for PUF applications [19-21]. Large RTN values may strongly impair the reliability of a PUF since the "response" of a given PUF in the "challenge" is more unstable due to large RTN values.

The previous research regarding PUFs are mainly based on simulations. Thus, [22] and [23] showed how the variation of the write time in the probabilistic switching of a memristive apparatus may be used as an entropy source. A higher energy consumption was predicted for active switching than for the static read-out of the resistor in each cycle.

Due to the stochastic behavior of memristors, they are ideal potential candidates for realizing encryption hardware. Memristors are novel microelectronic components whose electrical resistance may be adjusted selectively in dependence on the current flow and may then be maintained in a non-volatile manner without any external voltage present—thus, the term is made up of memory and resistor. Due to their non-volatile behavior, it is expected that memristors are not susceptible to noise and environmental influences. At the same time, the individual features of memristors strongly and uncontrollably depend on the manufacturing process and are therefore unpredictable. For example, memristors were described in [24]. Recently, $HfO_2$-based memristive components are used for PUF applications [25-26] involving a precise control of the divided reference voltage. The selection of the reference value may cause additional errors. In addition, a read amplifier with sufficient sensitivity is of decisive significance for a successful digitalization [27].

SUMMARY

An embodiment may have an apparatus for generating a binary numerical sequence, the apparatus comprising: two or more memristors, wherein the apparatus is configured to apply a first write voltage or a second write voltage, different from the first write voltage, as a write voltage to each of the two or more memristors, and/or to apply a first read voltage or a second read voltage, different from the first read voltage, as a read voltage to each of the two or more memristors, wherein each memristor of the two or more memristors is configured to output, in dependence on the write voltage applied to the memristor and/or in dependence on the read voltage applied to the memristor, an output voltage with a first random or pseudo-random voltage value from a first voltage value range or with a second random or pseudo-random voltage value from a second voltage value range; and one or more comparators, wherein each of the one or more comparators is assigned to precisely one of the two or more memristors; wherein each comparator of the one or more comparators is configured to output a binary output value in dependence on a comparison between the output voltage of the one of the two or more memristors having assigned thereto the comparator and a threshold voltage, and wherein the apparatus is configured to generate the binary numerical sequence in dependence on the binary output value of each of the one or more comparators, wherein each comparator of the one or more comparators is configured to perform the comparison between the output voltage of the one of the two or more memristors being assigned to the comparator and the same threshold voltage, wherein each of the one or more comparators is configured to use as the threshold voltage the output voltage of one of the two or more memristors.

Another embodiment may have a method for generating a binary numerical sequence, the method comprising: applying a write voltage that is a first write voltage or a second write voltage, different from the first write voltage, to each of two or more memristors, and/or applying a read voltage that is a first read voltage or a second read voltage, different from the first read voltage, to each of the two or more memristors, wherein each memristor of the two or more memristors outputs, in dependence on the write voltage applied to the memristor and/or in dependence on the read voltage applied to the memristor, an output voltage with a first random or pseudo-random voltage value from a first voltage value range or with a second random or pseudo-random voltage value from a second voltage value range; wherein of one or more comparators is assigned to precisely one of the two or more memristors; outputting a binary output value through each of one or more comparators in dependence on a comparison of each comparator of the one or more comparators between the output voltage of the one of the two or more memristors having assigned thereto the comparator and a threshold voltage; and generating the binary numerical sequence in dependence on the binary output value of each of the one or more comparators, wherein each comparator of the one or more comparators is configured to perform the comparison between the output voltage of the one of the two or more memristors being assigned to the comparator and the same threshold voltage, wherein each of the one or more comparators is configured to use as the threshold voltage the output voltage of one of the two or more memristors.

Another embodiment may have a non-transitory digital storage medium having a computer program stored thereon to perform the method for generating a binary numerical sequence, the method comprising: applying a write voltage that is a first write voltage or a second write voltage, different from the first write voltage, to each of two or more memristors, and/or applying a read voltage that is a first read voltage or a second read voltage, different from the first read voltage, to each of the two or more memristors, wherein each memristor of the two or more memristors outputs, in dependence on the write voltage applied to the memristor and/or in dependence on the read voltage applied to the memristor, an output voltage with a first random or pseudo-random voltage value from a first voltage value range or with a second random or pseudo-random voltage value from a second voltage value range; wherein of one or more comparators is assigned to precisely one of the two or more memristors; outputting a binary output value through each of one or more comparators in dependence on a comparison of each comparator of the one or more comparators between the output voltage of the one of the two or more memristors having assigned thereto the comparator and a threshold voltage; and generating the binary numerical sequence in dependence on the binary output value of each of the one or more comparators, wherein each comparator of the one or more comparators is configured to perform the comparison between the output voltage of the one of the two or more memristors being assigned to the comparator and the same threshold voltage, wherein each of the one or more comparators is configured to use as the threshold voltage the output voltage of one of the two or more memristors, when said computer program is run by a computer.

An apparatus for generating a binary numerical sequence according to an embodiment is provided. The apparatus includes two or more switchable elements. The apparatus is configured to apply a first write voltage or a second write voltage, different from the first write voltage, as a write voltage to each of the two or more switchable elements, and/or to apply a first read voltage or a second read voltage, different from the first read voltage, as a read voltage to each of the two or more switchable elements. Each switchable element of the two or more switchable elements is configured to output, in dependence on the write voltage applied to the switchable element and/or in dependence on the read voltage applied to the switchable element, an output voltage with a first random or pseudo-random voltage value from a first voltage value range or with a second random or pseudo-random voltage value from a second voltage value range. In addition, the apparatus includes one or more comparators, wherein each of the one or more comparators is assigned to precisely one of the two or more switchable elements. Each comparator of the one or more comparators is configured to output a binary output value in dependence on a comparison between the output voltage of the one of the two or more switchable elements having assigned thereto the comparator and a threshold voltage. The apparatus is configured to generate the binary numerical sequence in dependence on the binary output value of each of the one or more comparators.

In addition, a method for generating a binary numerical sequence according to an embodiment is provided. The method includes:

applying a write voltage that is a first write voltage or a second write voltage, different from the first write voltage, to each of two or more switchable elements, and/or applying a read voltage that is a first read voltage or a second read voltage, different from the first read voltage, to each of the two or more switchable elements, wherein each switchable element of the two or more switchable elements outputs, in dependence on the write voltage applied to the switchable element and/or in dependence on the read voltage applied to the switchable element, an output voltage with a first random or pseudo-random voltage value from a first voltage value range or with a second random or pseudo-random voltage value from a second voltage value range, wherein each of one or more comparators is assigned to precisely one of the two or more switchable elements.

outputting a binary output value through each of one or more comparators in dependence on a comparison of each comparator of the one or more comparators between the output voltage of the one of the two or more switchable elements having assigned thereto the comparator and a threshold voltage. And:

generating the binary numerical sequence in dependence on the binary output value of each of the one or more comparators.

In addition, a computer program having a program code for performing the above-described method according to an embodiment is provided.

In an embodiment, memristive components for PUFs with a low error rate and with a reference value that causes no additional errors are provided.

According to an embodiment, a memristive component is provided in a single cell implementation, a line implementation, or an array implementation, wherein the current-voltage (IV) characteristic of each cell is reproducible. The distribution of the "responses" (output), e.g. a read current, when requesting "challenges" (input), e.g. a write voltage, should be distributed in a Gaussian shape around a mean value that is specific for each cell of the memristive component in the single cell implementation, line implementation, or array implementation. The full width at half maximum of the Gaussian distribution of the "response" is so small that the "responses" distributed in a Gaussian shape can be mapped unambiguously to the corresponding cell of the memristive component.

For example, the reference value may be the "response" of the cell of the memristive component in the single cell implementation, line implementation, or array implementation whose maximum most probable "response" is the mean value of all maximum most probable responses of the cells of the memristive component in the single cell implementation, line implementation, or array implementation. The reliable operation of the PUF under extreme temperatures may be ensured, e.g., by a comparable variation of the IV characteristics of all cells of the memristive component in the single cell implementation, line implementation, or array implementation. For example, different PUFs may be realized with the same memristive component by using different "challenges" and different "responses". The selection of the "challenge" and the "response" is carried out such that the error rate of the PUF is as low as possible.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
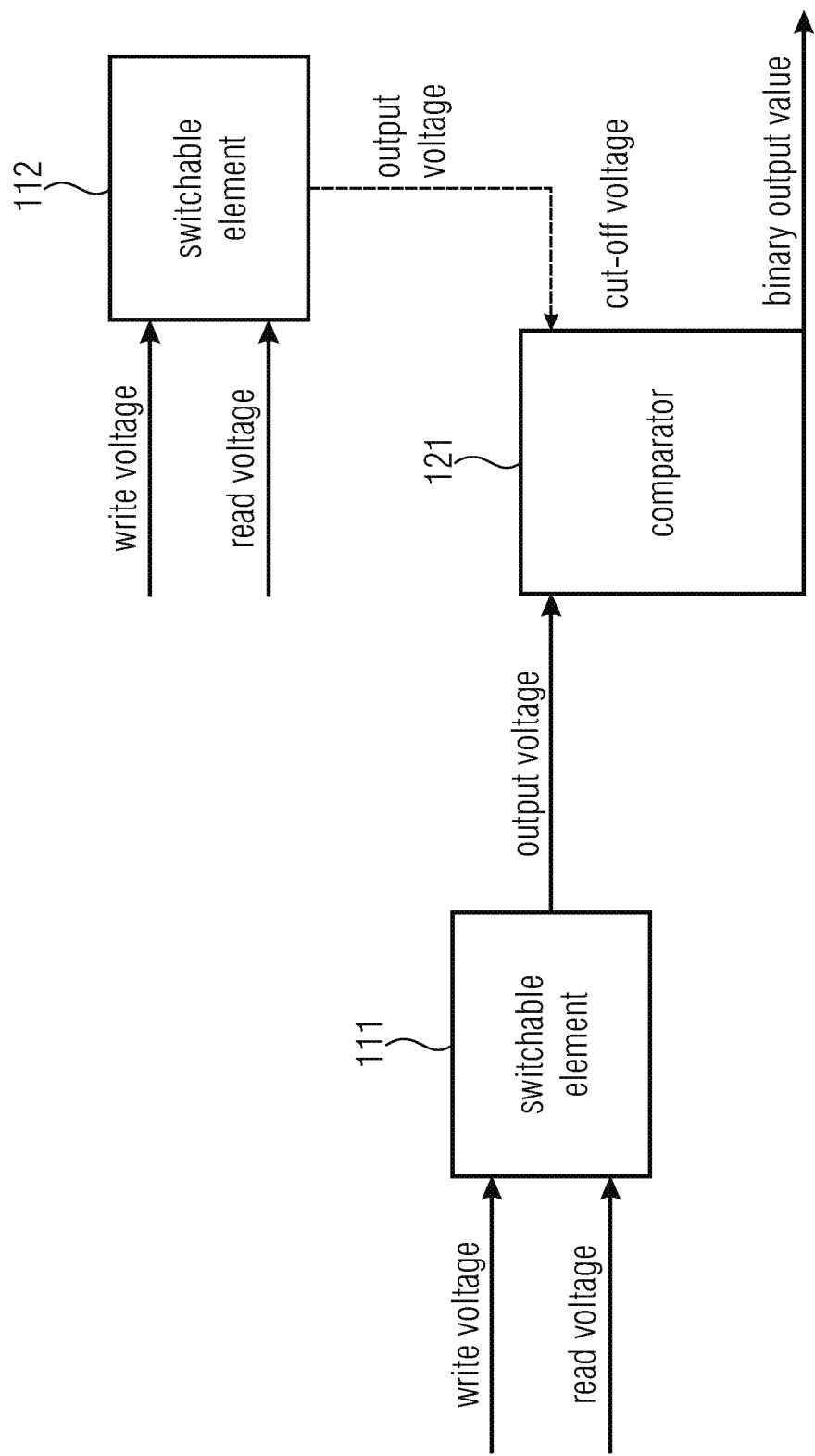
FIG. 1 shows an apparatus for generating a binary numerical sequence according to an embodiment.

FIG. 1 shows an apparatus for generating a binary numerical sequence according to an embodiment.

The apparatus includes two or more switchable elements 111, 112.

The apparatus is configured to apply a first write voltage or a second write voltage, different from the first write voltage, as a write voltage to each of the two or more switchable elements 111, 112, and/or to apply a first read voltage or a second read voltage, different from the first read voltage, as a read voltage to each of the two or more switchable elements 111, 112.

Each switchable element of the two or more switchable elements 111, 112 is configured to output, in dependence on the write voltage applied to the first switchable element and/or in dependence on the read voltage applied to the switchable element, an output voltage with a first random or pseudo-random voltage value from a first voltage value range or with a second random or pseudo-random voltage value from a second voltage value range.

In addition, the apparatus includes one or more comparators 121, wherein each of the one or more comparators 121 is assigned to precisely one of the two or more switchable elements 111, 112. Each comparator of the one or more comparators 121 is configured to output a binary output value in dependence on a comparison between the output voltage of the one of the two or more switchable elements 111, 112 having assigned thereto the comparator and a threshold voltage.

The apparatus is configured to generate the binary numerical sequence in dependence on the binary output value of each of the one or more comparators 121.

According to an embodiment, e.g., the apparatus may be configured to apply the same predefined write voltage to each of the two or more switchable elements 111, 112.

In an embodiment, e.g., the apparatus may be configured to apply the same predefined read voltage to each of the two or more switchable elements 111, 112.

According to an embodiment, e.g., each comparator of the one or more comparators 121 may be configured to perform the comparison between the output voltage of the one of the two or more switchable elements 111, 112 being assigned to the comparator and the same threshold voltage.

In an embodiment, e.g., each of the one or more comparators may be configured to use as the threshold voltage the output voltage of one of the two or more switchable elements 111, 112.

According to an embodiment, e.g., each of the one or more comparators may be configured to use as the threshold voltage the output voltage of one of the two or more switchable elements 111, 112 not having assigned thereto any of the one or more comparators 121.

In an embodiment, e.g., precisely one of the two or more switchable elements 111, 112 may not have assigned thereto any of the one or more comparators 121.

According to an embodiment, e.g., the apparatus may comprise a number of switchable elements of the two or more switchable elements 111, 112 that is larger by one than the number of comparators of the one or more comparators.

In an embodiment, e.g., the apparatus may comprise three or more switchable elements 111, 112 and two or more comparators 121.

According to an embodiment, e.g., each of the one or more comparators 121 may be configured to output a first binary value as the binary output value if the first output voltage from the first value range is smaller than or equal to the threshold voltage; and to output a second binary value, different from the first binary value, as the binary output value if the first output voltage from the first value range is larger than the threshold voltage.

In an embodiment, e.g., each of the one or more switchable elements 110 may be a memristor.

According to an embodiment, e.g., each of the one or more switchable elements 110 may comprise yttrium-manganese oxide.

In an embodiment, e.g., each of the one or more switchable elements 110 may comprise bismuth ferrite and/or titanium-doped bismuth ferrite.

According to an embodiment, e.g., the threshold voltage may be defined such that a statistical probability that the first output voltage with the first random or pseudo-random voltage value is larger than the threshold voltage comprises a value of between 45% and 55%.

In an embodiment, e.g., the threshold voltage may be set such that the statistical probability that the first output voltage with the first random or pseudo-random voltage value is larger than the threshold voltage is 50%.

According to an embodiment, e.g., the apparatus may be configured to apply the write voltage and the read voltage to each of the two or more switchable elements 111, 112, wherein, e.g., each switchable element of the two or more switchable elements 111, 112 may be configured to output the output voltage in dependence on the write voltage applied to the switchable element and the read voltage applied to the switchable element.

The actual polarity and amplitude of the write bias voltage applied are determined through the potential of the upper electrode (T1) and the lower electrode (T2) of the resistor switch. For example, the upper electrode (T1) may be considered to be the reference for the bias voltage applied to the device. The potential of the upper electrode being higher than that of the lower electrode may be regarded as a positive voltage applied to the device. Otherwise, the potential of the lower electrode having a higher potential may be regarded as a negative voltage applied to the device.

It is to be noted that there is no potential difference at the device if the upper electrode and the lower electrode have the same potential, i.e., there would be no actual voltage present at the device.

Particular embodiments and explanations thereof are provided in the following.

In an embodiment for a hardware-based PUF, e.g., a BiFeO3 (BFO) memristor may be used as a bipolar switch with a reconfigurable barrier height and with two reconfigurable barrier heights.

Figure 2:
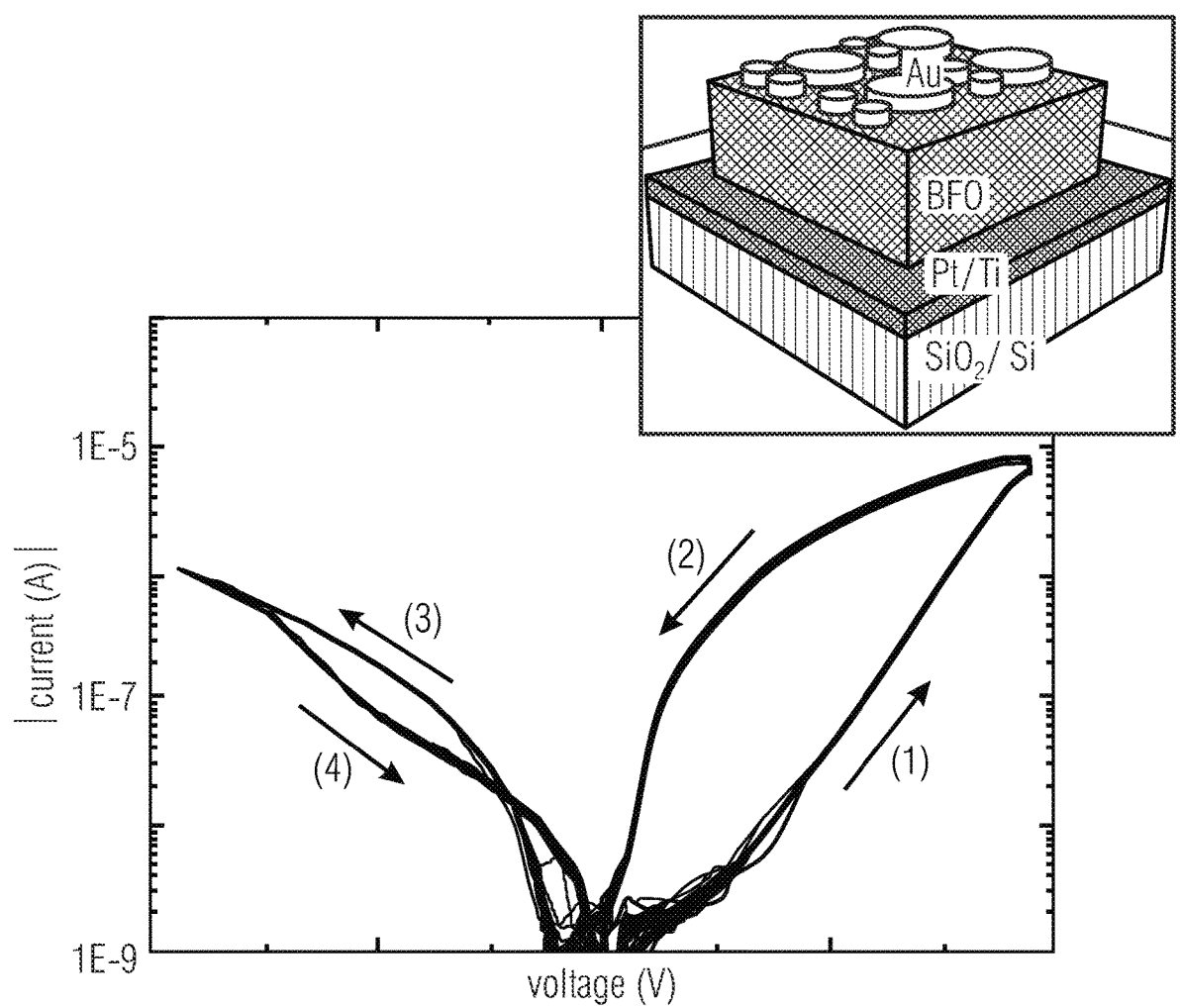
FIG. 2 shows an experimental current-voltage characteristic of a single cell of a memristive component according to an embodiment.

FIG. 2 shows an experimental current-voltage characteristic (IV characteristic) of a single cell of a BFO-based memristive component in a semi-log scale (repetition of 500 cycles). The sizes of the upper contact area are 0.1 mm$^2$. The impulse width is tp=10 ms. The voltage amplitude for ramping the voltage in the positive and negative direction is Vw=|6 V|. The sketch in the inset shows the structure of an individual cell of a BFO-based memristive component.

In particular, the IV characteristic of an individual cell of the BFO-based memristive component (FIG. 2, 500 cycles) shows a reproducible hysteretic IV characteristic when ramping the voltage between −6 V and +6 V. This reproducible switching behavior is caused by the redistribution of mobile donators (oxygen point defects) in the BFO and their trapping/release by fixed donators (Ti donators). SET and RESET are trigger by different voltage polarities, i.e. positive write pulses switch the memristor into the LRS, whereas negative write pulses switch the memristor into the HRS. The conductivity in the LRS and HRS is defined as the conductance value in case of a low read bias voltage (Vr) if the memristor is in the LRS (GLRS) or HRS (GHRS). The OFF/ON conductivity ratio of a single cell of a memristive component is referred to as GLRS/GHRS.

Effectively and stably trapping and releasing mobile oxygen defect points through fixed Ti donators in the proximity of the lower electrode [28] leads to unreliable switching characteristics in single BFO membrane cells (FIG. 2).

Figure 3:
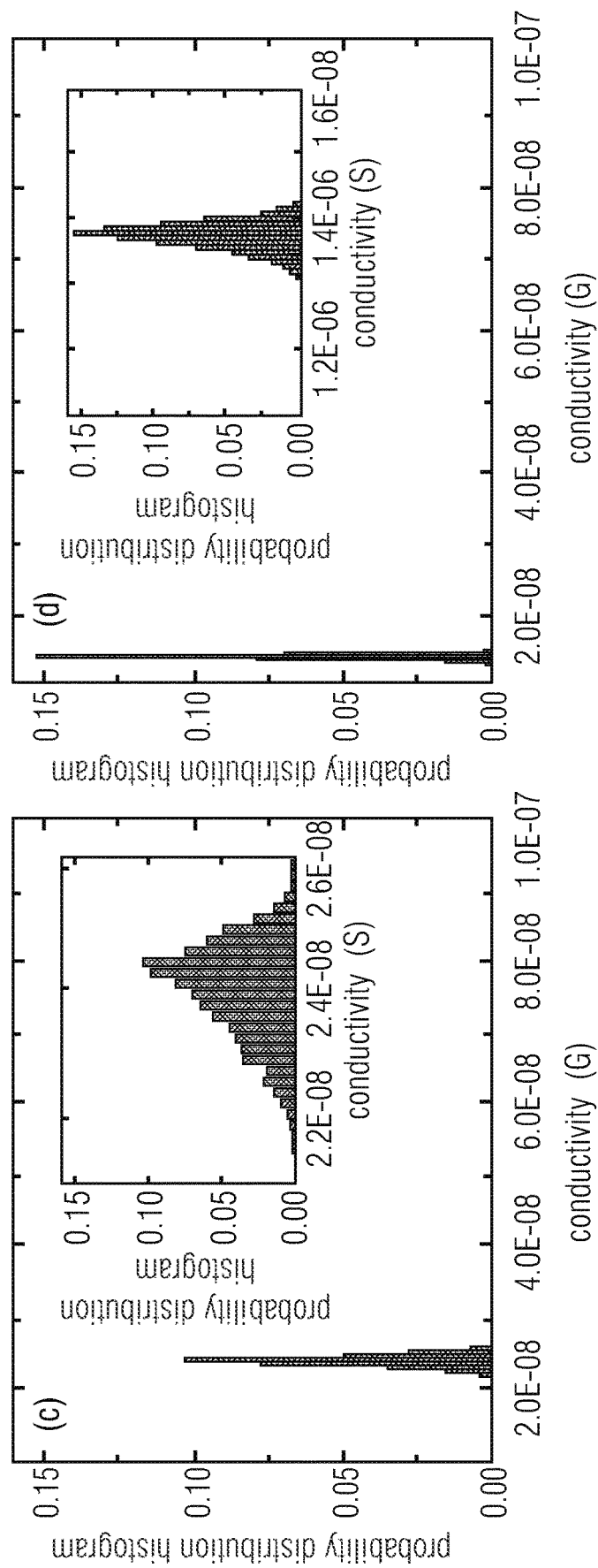
FIG. 3 shows a conductivity distribution (histogram) in a single cell of a memristive component according to an embodiment.

FIG. 3 shows the conductivity distribution (histogram) in a single cell of a BFO-based memristive component in the case of a read voltage of +3 V after initializing the cell (a) in the HRS (branch (1) in 1) or (b) in the LRS (branch (2) in 1). Conductivity distributions in case of a −3 V read voltage after initializing the cell (c) in the LRS (1) or (d) in the HRS (1). The sizes of the upper contact area are 0.1 mm$^2$. The impulse width for the initialization is tp=10 ms.

In particular, FIG. 3 shows the conductivity histograms as a preliminary result in a single BFO memory cell in different operation windows. The conductivity distributions are Gaussian shaped with a very small half width at full maximum, indicating reliable switching in the BFO cell.

Figure 4:
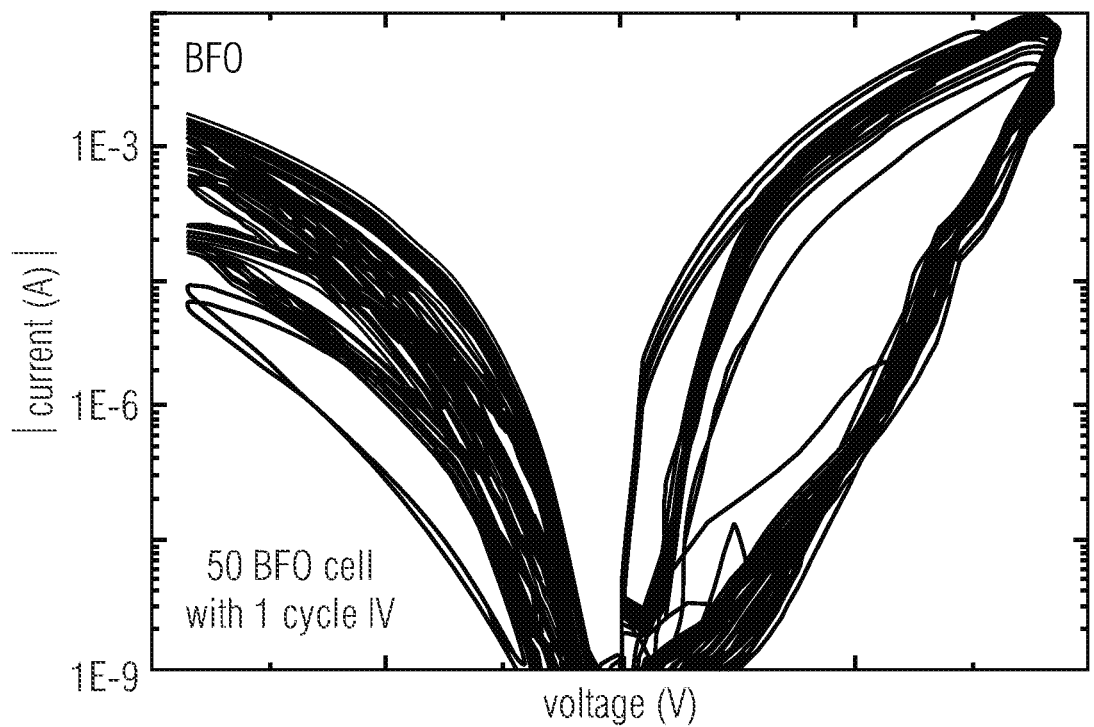
FIG. 4 shows the current-voltage characteristic of 50 different cells of a memristive component according to an embodiment.

FIG. 4 shows an experimental IV characteristic (first cycle) of 50 different cells of a BFo-based memristive component in the semi-log scale. The manufacturing parameters for the 50 cells of the memristive component were equal. The voltage amplitude for ramping the voltage in the positive and negative directions is Vw=|6 V|.

Due to randomly distributed process fluctuations during the manufacturing process of memristive components during the same preparation processes, the IV characteristic for different cells of memristive components is different (cf. FIG. 4). The randomness of the scattering of the oxygen defect points is an obstacle for the cloning of fingerprints, and the unambiguous fingerprints of each device were consistent after the production. Depending on the write interruption with respect to the single BFO apparatus, the capability to reach the conductivity above the predetermined reference conductivity in case of a certain write interruption is random (1 for the conductivity in case of a read bias above the reference conductivity, 0 for the other cases). Thus, BFO-based memristive components be used as a physical unclonable function.

An embodiment for the operation of an apparatus for hardware-based physical unclonable functions (PUF) is provided in the following. The inherent manufacturing process variations define a random one-off input-output behavior (or challenge-response behavior) in a BFO-based memristive component (cf. FIG. 4) that may be used for designing a PUF. This is because the switching conductivity varies from cell to cell. The inventive PUF design is based on the fact that the stochastic distribution of oxygen defect points is translated into a random binary bitstream serving as a device fingerprint, while the excellent switching behavior in BFO-based memristive components enables a Gaussian-shaped distribution of the "response" to a "challenge".

Figure 5:
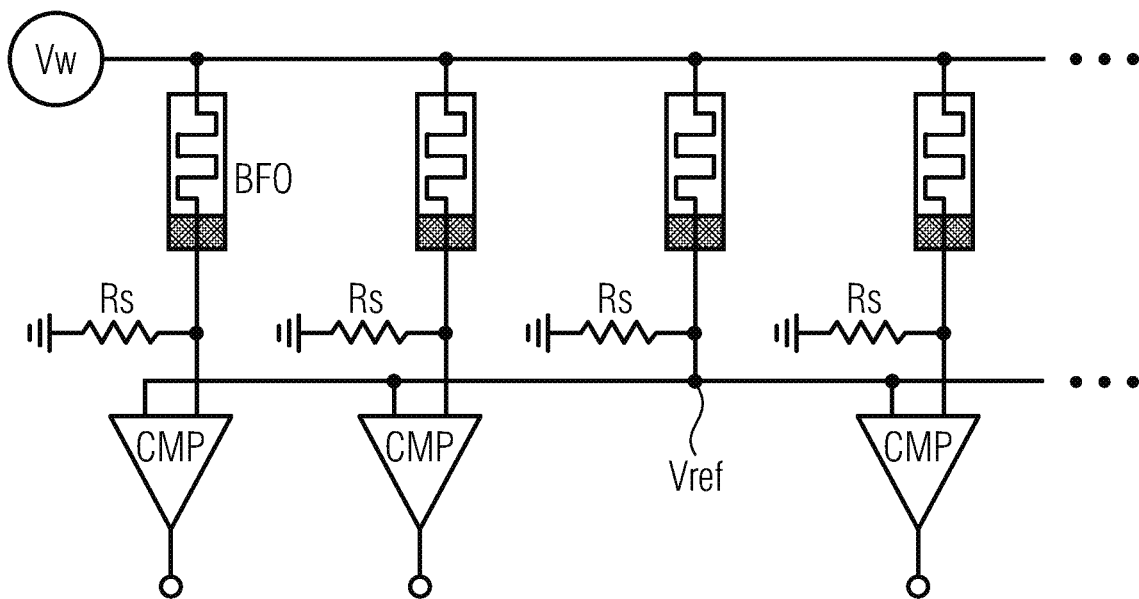
FIG. 5 shows a circuit of an n-bit PUF according to an embodiment.

FIG. 5 shows the circuit of an n-bit PUF which also includes, among other things, a memristive component. e. g. on the basis of BFO, with n+1 memristors arranged in series. By using a current comparator, the circuit may be simplified further, for example.

In the PUF shown in FIG. 5, the n-bit BFO membrane cells are controlled in parallel by means of a source voltage Vw. The random voltage value across each resistor Rs connected individually in series with each BFO membrane cell is compared to the reference voltage Vref. If a voltage value across Rs is higher than Vref, bit "1" is generated. Otherwise, bit "0" is generated. The proposed PUF with n-bit BFO memristive cells may generate (n−1) random bits in real time. One could vary Vref so as to realize more challenge-response pairs (CRPS).

Overall, the circuit arrangement of FIG. 5 generates therefore n−1 bits of a binary numerical sequence.

Due to the high reproducibility of the IV characteristics of a cell observed in previous experiments, a high reliability of BFO PUFs is to be expected. The advantageous randomness of the dispersion is an obstacle for the cloning of fingerprints and the unique fingerprints of each device where consistent cross after manufacturing. By using the RESET process, the fingerprints may be removed easily from the analog interface block and may be retriggered by the freely-selected SET deviation.

Compared to existing memristor-based PUFs, the first advantage of the proposed BFO PUFs is its expected high reliability and therefore very low bit error rate (due to the stable switching characteristics of BFO memristor cells) in 1). The second advantage is the expected low resilience against changes of the operation temperature: the conductivity of single cells in BFO-based memristive components increases in a certain operation window with an increasing temperature (GOFFSET) with the same tendency. Thus, the values of the differences of the binary bits at the output of the comparator are stable and independent of the temperature due to the compensation of the resulting GOFFSET.

Further embodiments are provided in the following.

According to an embodiment, e.g., a memristor-based physical unclonable function in which the threshold parameter for mapping a probability is defined with the write voltage Uw and the revoltage Ur is provided.

In an embodiment, e.g., memristor-based physical unclonable functions have for a specified write voltage Uw at least one read voltage Ur in which the read current is distributed in a Gaussian shape.

According to an embodiment, e.g., memristor-based physical unclonable functions have for a specified read voltage Ur at least one write voltage Uw in which the read current is distributed in a Gaussian shape.

In an embodiment, e.g., a reference parameter (limit value/threshold, e.g. a threshold voltage) for a specified probability is defined either via the write voltage Uw or via the read voltage Ur. For example, this definition may depend on environmental conditions (PUF circuit, temperature, . . . ).

For example, a memristor-based n-bit PUF with an additional memristor as a reference is used as an application example.

According to an embodiment, the memristors of the n-bit PUF, e.g., have a mutual or a structured rear electrode and are configured as a line array or a cross bar array, for example.

For example, in an embodiment, the values of the write voltage Uw and the read voltage Ur for reaching a specified read current Ir depend on the environmental conditions (PUF circuit, temperature, etc). The occurring shift of the read current Ir, e.g., may be compensated with the additional memristor as a reference, e.g., and the problem of the resilience may be solved.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed by a hardware device (or using a hardware device). In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier. In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier or the digital storage medium or the computer-readable medium are typically tangible or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY

[1] R. H. Weber, R. Weber, "Internet of Things", Springer. Vol. 12 (2010).
[2] F. Regazzoni, I. Polian, "Securing the hardware of cyber-physical systems," Asian South Pacific Design Automation Conf. (ASP-DAC): 194-199 (2017).
[3] R. Pappu, B. Recht, J. Taylor and N. Gershenfeld. Physical one-way functions. Science, 297(5589):2026-30 (2002).
[4] B. Gassend, D. Clarke, M. Van Dijk and S. Devadas. Silicon physical random functions. in Proc. CCS, ACM, 148-160 (2002).

[5] G. E. Suh and S. Devadas. Physical unclonable functions for device authentication and secret key generation. Proc. Des. Autom. Conf. ACM, 9-14 (2007).

[6] R. Horstmeyer, B. Judkewitz, I. M. Vellekoop, S. Assawaworrarit and C. Yang. Physical key-protected one-time pad. Sci. Rep. 3: 3543 (2013).

[7] A. Maiti and P. Schaumont, Improving the quality of a physical unclonable function using configurable ring oscillators. In: International Conference on Field Programmable Logic and Applications, FPL International Conf. 2009, IEEE 703-707 (2009).

[8] R. Helinski, D. Acharyya and J. Plusquellic. A physical unclonable function defined using power distribution system equivalent resistance variations. DAC '09 Proceedings of the 46th Annual Design Automation Conference, 676-681 (2009).

[9] A. F. Smith, P. Patton and S. E. Skrabalak. Plasmonic Nanoparticles as a Physically Unclonable Function for Responsive anti-counterfeit nanofingerprints. Adv. Funct. Mater. 26: 1315-1321 (2016).

[10] J. Kim, J. M. Yun, J. Jung, H. Song, J. B. Kim and H. Ihee, Anti-counterfeit nanoscale fingerprints based on randomly distributed nanowires. Nanotechnology, 25, 155303 (2014).

[11] A. Maiti, V. Gunreddy and P. Schaumont. A systematic method to evaluate and compare the performance of physical unclonable functions. In: Athanas, P., Pnevmatikatos, D., Sklavos, N. (eds.) Embedded systems design with FPGAs, pp. 245-267. Springer, New York (2013).

[12] Y. Hori, T. Yoshida, T. Katashita and A. Satoh, Quantitative and statistical performance evaluation of arbiter physical unclonable functions on FPGAs. In: 2010 international conference on reconfigurable computing and FPGAs (ReConFig). IEEE pp. 298-303 (2010).

[13] D. E. Holcomb, W. P. Burleson and K. Fu. Power-up SRAM state as an identifying fingerprint and source of true random numbers. IEEE Transactions on Computers 58 (9), 1198-1210 (2008).

[14] D. E. Holcomb, W. P. Burleson and K. Fu, Initial SRAM state as a fingerprint and source of true random numbers for RFID tags Proceedings of the Conference on RFID Security 7 (2), 01 (2007).

[15] J. Guajardo, S. S. Kumar, G. J. Schrijen and P. Tuyls, in CHES, 2007, vol. 4727, pp. 63-80.

[16] J. Rajendran, G. S. Rose, R. Karri and M. Potkonjak, VLSI (ISVLSI), 2012 IEEE Computer Society Annual Symposium on, IEEE, 2012.

[17] P. Koeberl, Ü. Kocabaş and A. Sadeghi, "Memristor PUFs: A new generation of memory-based Physically Unclonable Functions," 2013 Design, Automation & Test in Europe conference & Exhibition (DATE), 428-431 (2013).

[18] G. S. Rose, N. McDolnald, L. K. Ya, B. Wysocki, "A write-time based memristive PUF for hardware security applications", In IEEE/ACM International Conference on Computer-Aided Design (ICCAD), (2013).

[19] M. Terai, et al, "Effect of bottom electrode of ReRAM with Ta2O5/TiO2 stack on RTN and retention," IEDM Tech. Dig., 775 (2009).

[20] J. K. Lee, et al, "Extraction of trap location and energy from random telegraph noise in amorphous TiOx resistance random access memories," Appl. Phy. Lett. 98, 143502 (2011).

[21] N. Raghavan, et al, "RTN insight to filamentary instability and disturb immunity in ultra-low power switching HfOx and AlOx RRAM," IEEE Sym. VLSI Tech., 164 (2013).

[22] G. S. Rose, N. McDolnald, L. K. Ya, B. Wysocki. A write-time based memristive PUF for hardware security applications. In IEEE/ACM International Conference on Computer-Aided Design (ICCAD), 2013.

[23] P. Koeberl, U. Kocaba, A. —R. Sadeghi. Memristor PUFs: A new generation of memristor-based physically unclonable functions. In Design, Automation and Test in Europe (DATE), 2014.

[24] H. Schmidt, T. Mikolajick, R. Waser, E. Linn. Big Data ohne Energiekollaps. Physik in unserer Zeit 46 (2) (2015).

[25] L. Gao, P. Y. Chen, R. Liu and S. Yu, "Physical unclonable function exploiting sneak paths in resistive cross-point array", IEEE Trans. Electron Devices, 63, 3109-3115 (2016).

[26] R. Liu, H. Wu, Y. Pang, H. Qian and S. Yu, "Experimental Characterization of Physical Unclonable Function Based on 1 kb Resistive Random Access Memory Arrays", IEEE Electron Device Letters, 36(12): 1380-1383 (2015).

[27] R. Liu, H. Wu, Y. Pang, H. Qian and S. Yu, "A highly reliable and tamper-resistant RRAM PUF: Design and experimental validation", 2016 IEEE International Symposium on Hardware Oriented Security and Trust (HOST), IEEE (2016).

[28] T. You, N. Du, S. Slesazeck, T. Mikolajick, G. Li, D. Burger, "Bipolar electricfield enhanced trapping and detrapping of mobile donors in BiFeO3 memristors", ACS applied materials & interfaces, 6.22 (2014).

The invention claimed is:

1. Apparatus for generating a binary numerical sequence, the apparatus comprising:

two or more memristors, wherein the apparatus is configured to apply a first write voltage or a second write voltage, different from the first write voltage, as a write voltage to each of the two or more memristors, and/or to apply a first read voltage or a second read voltage, different from the first read voltage, as a read voltage to each of the two or more memristors, wherein each memristor of the two or more memristors is configured to output, in dependence on the write voltage applied to the memristor and/or in dependence on the read voltage applied to the memristor, an output voltage with a first random or pseudo-random voltage value from a first voltage value range or with a second random or pseudo-random voltage value from a second voltage value range; and one or more comparators, wherein each of the one or more comparators is assigned to precisely one of the two or more memristors;

wherein each comparator of the one or more comparators is configured to output a binary output value in dependence on a comparison between the output voltage of the one of the two or more memristors having assigned thereto the comparator and a threshold voltage, and wherein the apparatus is configured to generate the binary numerical sequence in dependence on the binary output value of each of the one or more comparators, wherein each comparator of the one or more comparators is configured to perform the comparison between the output voltage of the one of the two or more memristors being assigned to the comparator and the same threshold voltage, wherein each of the one or more comparators is configured to use as the threshold voltage the output voltage of one of the two or more memristors.

2. Apparatus according to claim 1,
wherein the apparatus is configured to apply the same predefined write voltage to each of the two or more memristors.

3. Apparatus according to claim 1,
wherein the apparatus is configured to apply the same predefined read voltage to each of the two or more memristors.

4. Apparatus according to claim 1,
wherein each of the one or more comparators is configured to use as the threshold voltage the output voltage of one of the two or more memristors not having assigned thereto any of the one or more comparators.

5. Apparatus according to claim 4,
wherein precisely one of the two or more memristors does not have assigned thereto any of the one or more comparators.

6. Apparatus according to claim 1,
wherein the apparatus comprises a number of memristors of the two or more memristors that is larger by one than the number of comparators of the one or more comparators.

7. Apparatus according to claim 1,
wherein the apparatus comprises three or more memristors and two or more comparators.

8. Apparatus according to claim 1,
wherein each of the one or more comparators is configured to output a first binary value as the binary output value if the first output voltage from the first value range is smaller than or equal to the threshold voltage; and to output a second binary value, different from the first binary value, as the binary output value if the first output voltage from the first value range is larger than the threshold voltage.

9. Apparatus according to claim 1,
wherein each of the two or more memristors comprises yttrium-manganese oxide.

10. Apparatus according to claim 1,
wherein each of the two or more memristors comprises bismuth ferrite and/or titanium-doped bismuth ferrite.

11. Apparatus according to claim 1,
wherein the threshold voltage is defined such that a statistical probability that the first output voltage with the first random or pseudo-random voltage value is larger than the threshold voltage comprises a value of between 45% and 55%.

12. Apparatus according to claim 11,
wherein the threshold voltage is set such that the statistical probability that the first output voltage with the first random or pseudo-random voltage value is larger than the threshold voltage is 50%.

13. Apparatus according to claim 1,
wherein the apparatus is configured to apply the write voltage and the read voltage to each of the two or more memristors, wherein each memristor of the two or more memristors is configured to output the output voltage in dependence on the write voltage applied to the memristor and the read voltage applied to the memristor.

14. Method for generating a binary numerical sequence, the method comprising:
applying a write voltage that is a first write voltage or a second write voltage, different from the first write voltage, to each of two or more memristors, and/or applying a read voltage that is a first read voltage or a second read voltage, different from the first read voltage, to each of the two or more memristors, wherein each memristor of the two or more memristors outputs, in dependence on the write voltage applied to the memristor and/or in dependence on the read voltage applied to the memristor, an output voltage with a first random or pseudo-random voltage value from a first voltage value range or with a second random or pseudo-random voltage value from a second voltage value range; wherein of one or more comparators is assigned to precisely one of the two or more memristors;

outputting a binary output value through each of one or more comparators in dependence on a comparison of each comparator of the one or more comparators between the output voltage of the one of the two or more memristors having assigned thereto the comparator and a threshold voltage; and generating the binary numerical sequence in dependence on the binary output value of each of the one or more comparators, wherein each comparator of the one or more comparators is configured to perform the comparison between the output voltage of the one of the two or more memristors being assigned to the comparator and the same threshold voltage, wherein each of the one or more comparators is configured to use as the threshold voltage the output voltage of one of the two or more memristors.

15. A non-transitory digital storage medium having a computer program stored thereon to perform the method for generating a binary numerical sequence, the method comprising:
applying a write voltage that is a first write voltage or a second write voltage, different from the first write voltage, to each of two or more memristors, and/or applying a read voltage that is a first read voltage or a second read voltage, different from the first read voltage, to each of the two or more memristors, wherein each memristor of the two or more memristors outputs, in dependence on the write voltage applied to the memristor and/or in dependence on the read voltage applied to the memristor, an output voltage with a first random or pseudo-random voltage value from a first voltage value range or with a second random or pseudo-random voltage value from a second voltage value range; wherein of one or more comparators is assigned to precisely one of the two or more memristors;

outputting a binary output value through each of one or more comparators in dependence on a comparison of each comparator of the one or more comparators between the output voltage of the one of the two or more memristors having assigned thereto the comparator and a threshold voltage; and generating the binary numerical sequence in dependence on the binary output value of each of the one or more comparators, wherein each comparator of the one or more comparators is configured to perform the comparison between the output voltage of the one of the two or more memristors being assigned to the comparator and the same threshold voltage, wherein each of the one or more comparators is configured to use as the threshold voltage the output voltage of one of the two or more memristors, when said computer program is run by a computer.

* * * * *